United States Patent
Michl et al.

(10) Patent No.: US 9,629,001 B2
(45) Date of Patent: Apr. 18, 2017

(54) METHOD AND MEASURING SYSTEM FOR THE MEASUREMENT AND TESTING OF A MOBILE-TELEPHONE DEVICE

(75) Inventors: Andreas Michl, Munich (DE); Adrian Schumacher, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 942 days.

(21) Appl. No.: 12/446,886

(22) PCT Filed: Sep. 27, 2007

(86) PCT No.: PCT/EP2007/008438
§ 371 (c)(1),
(2), (4) Date: Apr. 23, 2009

(87) PCT Pub. No.: WO2008/049498
PCT Pub. Date: May 2, 2008

(65) Prior Publication Data
US 2011/0151797 A1    Jun. 23, 2011

(30) Foreign Application Priority Data
Oct. 27, 2006  (DE) .......................... 10 2006 050 872

(51) Int. Cl.
*H04W 24/00* (2009.01)
*H04W 24/04* (2009.01)
*H04W 28/18* (2009.01)

(52) U.S. Cl.
CPC ........... *H04W 24/00* (2013.01); *H04W 24/04* (2013.01); *H04W 28/18* (2013.01)

(58) Field of Classification Search
CPC ...... H04W 24/00; H04W 24/04; H04W 28/18
USPC ............................................. 455/67.11–67.14
See application file for complete search history.

(56) References Cited

U.S. PATENT DOCUMENTS

| | | | |
|---|---|---|---|
| 5,706,333 A * | 1/1998 | Grenning | H04W 24/00 379/29.01 |
| 5,933,776 A * | 8/1999 | Kirkpatrick | H04B 7/18573 455/423 |
| 2005/0124296 A1* | 6/2005 | Hayashi | 455/67.11 |
| 2006/0234741 A1* | 10/2006 | Provvedi | 455/513 |

FOREIGN PATENT DOCUMENTS

| | | |
|---|---|---|
| DE | 20013869 U1 | 12/2000 |
| EP | 1696682 A1 | 8/2006 |
| KR | 10-2005-0116862 A | 12/2005 |

OTHER PUBLICATIONS

"How to do Measurements according to TS 34.121 in presence of the HS-DPCCH with the R&S CUM200", Rohde & Schwarz, Nov. 2005.*

(Continued)

*Primary Examiner* — Raymond Dean
(74) *Attorney, Agent, or Firm* — Ditthavong & Steiner, P.C.

(57) ABSTRACT

The measurement method presented and the measuring device presented allow inferences to be gained regarding the status and the quality of mobile telephone user equipment by correlating operating parameters with the transmission power of a mobile telephone transmitter and the Transport Format Combination Indicator (TFCI).

20 Claims, 8 Drawing Sheets

(56) References Cited

OTHER PUBLICATIONS

"Test Master Plan for the NETEX Program," The Defense Advanced Research Projects Agency Networking in Extreme Environments (NETEX) Program, Aug. 15, 2002, pp. 1-35.
"Recommended Minimum Performance Standards for cdma2000 Spread Spectrum Base Stations Release C," 3rd Generation Partnership Project 2, Jan. 14, 2005, pp. 1-90.
"How to do Measurements According to TS 34.121 in presence of the HS-DPCCH with the R&S CMU200," Rohde & Schwarz GmbH & Co. KG, Nov. 2005, pp. 1-20.
"High Speed Downlink Packet Access (HSDPA) Test and Measurement Requirements," Rohde & Schwarz GmbH & Co. KG, Jan. 2005, pp. 1-29.
"3GPP TS 25.214 V7.2.0, 3rd Generation Partnership Project; Technical Specification Group Radio Access Network; Physical Layer Procedures (FDD) Release 7," 3rd Generation Partnership Project, Sep. 2006, pp. 1-60.
"3GPP TR 25.848 V4.0.0, 3rd Generation Partnership Project; Technical Specification Group Radio Access Network; Physical Layer Aspects of UTRA High Speed Downlink Packet Access Release 4," 3rd Generation Partnership Project, Mar. 2001, pp. 1-89.
International Search Report, WO 2008/049498 A1, Rohde & Schwarz GmbH & Co. KG, Feb. 15, 2008, pp. 31-36.
International Preliminary Report on Patentability, PCT/EP2007/008438, May 22, 2009, pp. 1-6.
Office Action for corresponding Korean Patent Application No. 10-2009-7008454 dated Aug. 12, 2013, 4 pages.

\* cited by examiner

METHOD AND MEASURING SYSTEM FOR THE MEASUREMENT AND TESTING OF A MOBILE-TELEPHONE DEVICE

CROSS-REFERENCE TO RELATED APPLICATION

The present application claims priority to German Application No. 10 2006 050 872.6, filed on Oct. 27, 2006, and PCT Application No. PCT/EP2007/008438, filed on Sep. 27, 2007, the entire contents of which are herein incorporated by reference.

BACKGROUND OF THE INVENTION

Field of the Invention

The invention relates to a method and a measuring system for the measurement and testing of a mobile-telephone device (UE).

Discussion of the Background

Following after GSM, GPRS and UMTS, HSDPA (High Speed Downlink Packet Access) and UMTS LTE (Long Term Evolution) have risen to prominence as the latest developments in the field of mobile telephone communications. The goal of HSDPA and UMTS LTE is the optimization of the UMTS system with regard to the support of data services. UMTS already offers rapid data services, such as the transmission of high-quality video data at a rate of 384 kbit/s.

Building on this, HSDPA and UMTS LTE utilize new technologies, which allow data rates up to 14 Mbit/s and further increase the capacity of the mobile-communications network as such. As a result, mobile-telephone operators can offer their customers improved multimedia services.

Figure 1:
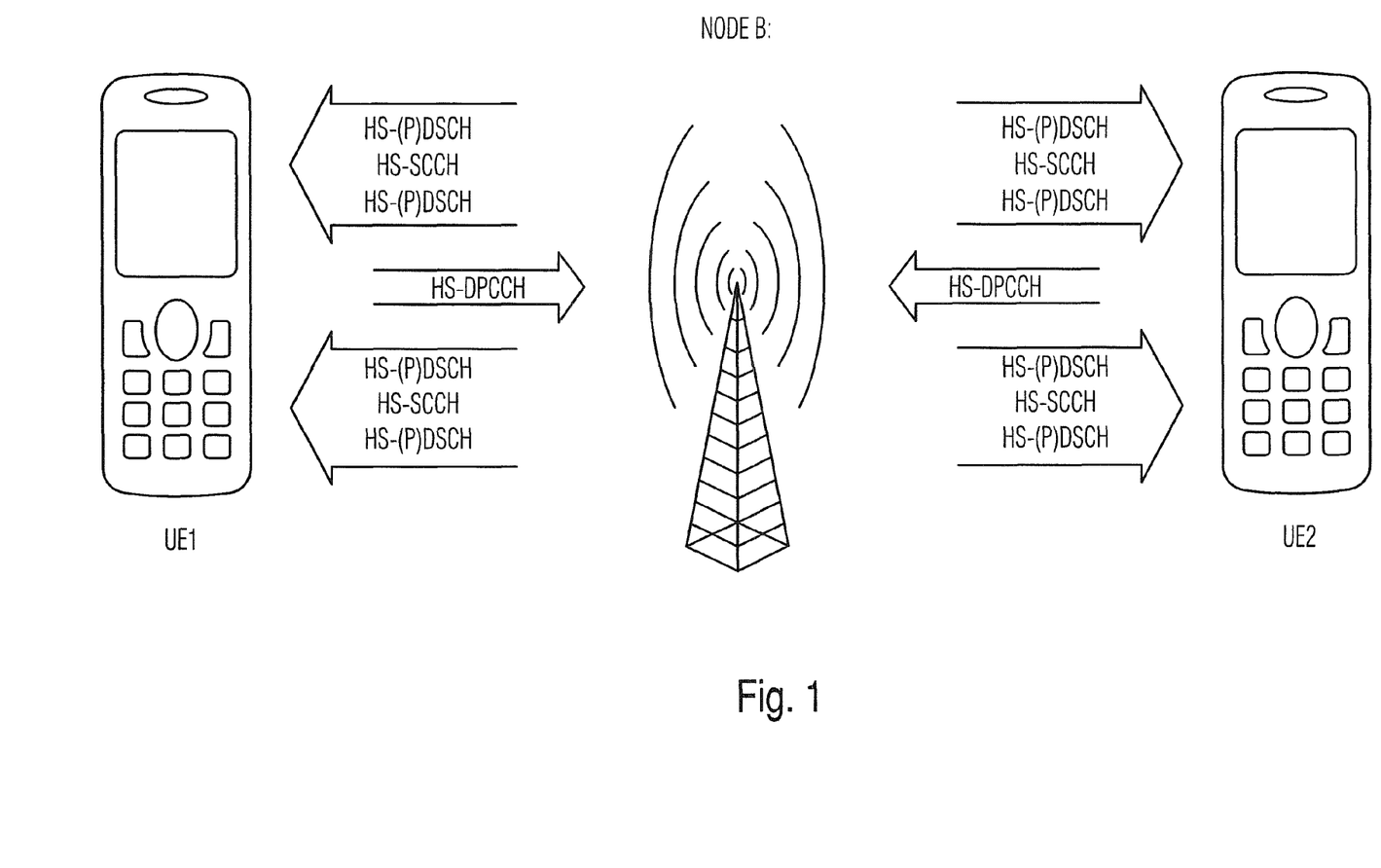
FIG. 1 shows a schematic display of the HDSPA technology.

FIG. 1 shows a schematic display of the HDSPA technology, in particular of the logical (and physical) channels used in HDSPA. The introduction of a new transmission channel for user data, the so-called High-Speed (Physical) Downlink Shared Channel, HS-(P)DSCH, is significant. Different users share the resources of the air interface, which are available on this channel. An intelligent algorithm in Node B decides which subscribers receive a data packet at which time.

This decision is communicated to the subscribers via a parallel signal channel, the so-called High-Speed Shared Control Channel, HS-SCCH. By contrast with UMTS, where a new data packet can be transmitted at most every 10 ms, in the case of HSDPA, a packet transmission can take place every 2 ms.

Figure 2:
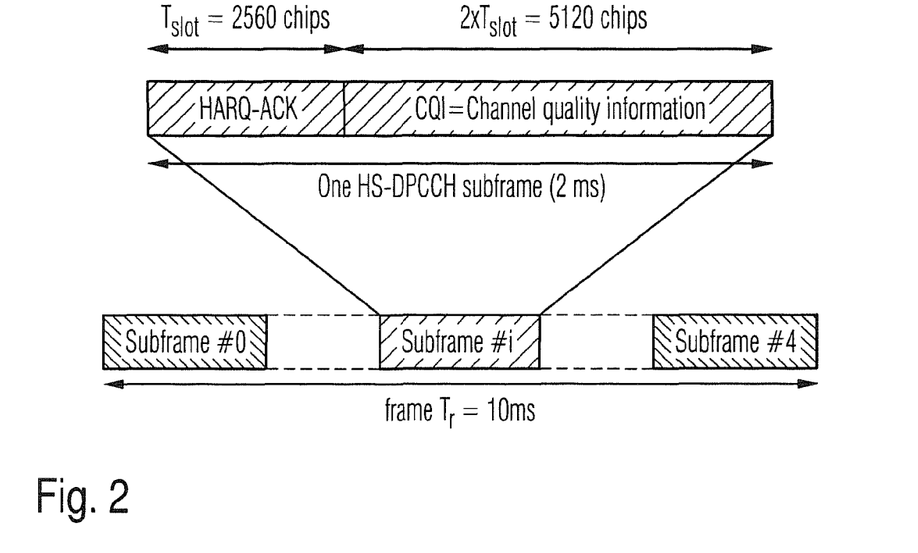
FIG. 2 shows a schematic display of the structure of the HS-DPCCH.

User reply messages regarding channel quality and also packet acknowledgements or negative acknowledgements are provided in the uplink on the so-called High-Speed Dedicated Physical Control Channel, HS-DPCCH. The HS-DPCCH is a physical uplink channel, which is used for the communication of management or control information: HARQ ACK/NACK and Channel-Quality Information. FIG. 2 shows a schematic display of the structure of the HS-DPCCH.

The Channel-Quality Information consists of the so-called CQI value, which relates to the CQI tables, which are described in the 3GPP specification TS 25.214 ("Physical layer procedures"). Different tables for different categories of user equipment (UE) exist, dependent upon the complexity of implementation of the UE. For example, Table 1 shows the CQI table for the UE categories 1 to 6.

TABLE 1

CQI mapping Table for UE categories 1 to 6.

| CQI value | Transport Block Size | Number of HS-PDSCH | Modulation | Reference power adjustment | NIR | XRV |
|---|---|---|---|---|---|---|
| 0 | N/A | Out of range | | | | |
| 1 | 137 | 1 | QPSK | 0 | 9600 | 0 |
| 2 | 173 | 1 | QPSK | 0 | | |
| 3 | 233 | 1 | QPSK | 0 | | |
| 4 | 317 | 1 | QPSK | 0 | | |
| 5 | 377 | 1 | QPSK | 0 | | |
| 6 | 461 | 1 | QPSK | 0 | | |
| 7 | 650 | 2 | QPSK | 0 | | |
| 8 | 792 | 2 | QPSK | 0 | | |
| 9 | 931 | 2 | QPSK | 0 | | |
| 10 | 1262 | 3 | QPSK | 0 | | |
| 11 | 1483 | 3 | QPSK | 0 | | |
| 12 | 1742 | 3 | QPSK | 0 | | |
| 13 | 2279 | 4 | QPSK | 0 | | |
| 14 | 2583 | 4 | QPSK | 0 | | |
| 15 | 3319 | 5 | QPSK | 0 | | |
| 16 | 3565 | 5 | 16-QAM | 0 | | |
| 17 | 4189 | 5 | 16-QAM | 0 | | |
| 18 | 4664 | 5 | 16-QAM | 0 | | |
| 19 | 5287 | 5 | 16-QAM | 0 | | |
| 20 | 5887 | 5 | 16-QAM | 0 | | |
| 21 | 6554 | 5 | 16-QAM | 0 | | |
| 22 | 7168 | 5 | 16-QAM | 0 | | |
| 23 | 7168 | 5 | 16-QAM | −1 | | |
| 24 | 7168 | 5 | 16-QAM | −2 | | |
| 25 | 7168 | 5 | 16-QAM | −3 | | |
| 26 | 7168 | 5 | 16-QAM | −4 | | |
| 27 | 7168 | 5 | 16-QAM | −5 | | |
| 28 | 7168 | 5 | 16-QAM | −6 | | |
| 29 | 7168 | 5 | 16-QAM | −7 | | |
| 30 | 7168 | 5 | 16-QAM | −8 | | |

The CQI values regularly reported by the user equipment UE are evaluated through Node B as a suggestion regarding how the HS-(P)DSCH is to be formatted. With this format, the user equipment (UE) anticipates the resulting block-error rate of the HS-DSCH as disposed below 0.1. The higher the CQI value, the higher the specification of the transmission format of the HS-DSCH will be, that is to say, the better the quality of the radio connection must be.

For example, if the user equipment (UE) reports a CQI value of 14 according to Table 1, it suggests an HS-(P) DSCH format with transmission-block size 2583 bits, 4 channels and QPSK (quadrature phase shift keying) modulation. If an HS-(P)DSCH is formatted in this manner, the transmission-block error rate of the HS-DSCH is estimated as disposed below 0.1. If Node B ignores the suggestion of the user equipment (UE) and selects a transmission format with higher specifications according to a higher CQI value, a higher transmission-block error rate would very probably occur on the HS-DSCH. Accordingly, Node B should ideally select a transmission format according to the recommendation from the user equipment (UE).

The selection of channel coding and modulation methods dependent upon the transmission quality is also summarised under the title "Adaptive Modulation and Coding Method" (AMC).

In order to secure a robust data transmission, HSDPA also uses a so-called HARQ (Hybrid Automatic Repeat Request) protocol. If a user device (UE) receives an error data packet, it requests the data packet again. Upon repetition of the packet transmission, Node B can select another type of coding, which allows the subscriber an improved reception (incremental redundancy). This type of coding is referred to in the specialist terminology as "redundancy and constellation version", or abbreviated as "redundancy version" (RV version) or redundancy type. If a packet has been transferred to the user equipment (UE), Node B must wait until the acknowledgement (ACK) or negative acknowledgement (NACK) for this packet has been received (so-called "stop-and-wait" transmission mechanism). In the intervening time, Node B can transmit further data packets to this user equipment (UE) via other HARQ processes. A user device must support up to 8 parallel HARQ processes, which are equivalent to up to 8 independent HARQ "stop-and-wait" transmission mechanisms.

Furthermore, methods for the exploitation of several antennas per transmitter and/or receiver (Multiple Input Multiple Output or MIMO), which exploit so-called spatial diversity, wherein (identical) antennas are erected at a given spacing distance from one another but with the same orientation, and/or polarization diversity, according to which two antennas are erected with an angular difference of 90 degrees relative to one another, in order to reduce interference effects in the radio transmission and to increase the peak throughput by means of code reuse, are known and can, in principle, be used within the framework of HSDPA. Reference is made to the technical report "Physical layer aspects of UTRA High-Speed Downlink Packet Access" (3GPP-specification 3GPP TR 25.848 specification) for the details.

The structure of an HSDPA or UMTS LTE compatible network requires special test and measurement solutions. In particular, test and measurement solutions are required, which provide information about a potential error matching of the user equipment used (clipping) or its general defectiveness, about a defective implementation and about the resource efficiency of the equipment used (performance).

SUMMARY OF THE INVENTION

Embodiments of the present invention therefore advantageously indicate a measurement method and a measurement system, which provide the named information.

The essential idea of the invention is to present operating parameters, such as the data throughput, CQI (Channel Quality Indicator) and number of re-transmissions for a data packet, in each case dependent upon the transmission power or respectively the TFCI (Transport Format Combination Identifier). In this context, with an increase in transmission power, a rising CQI value, an increasing data throughput and a declining number of re-transmissions can theoretically be anticipated. With an increase in TFCI, optionally dependent upon the implementation, a declining CQI value can be expected, and an increasing number of re-transmissions in each case with the same channel conditions. The data throughput will increase up to a given value, until the re-transmissions and the BER (Bit Error Rate) have a relatively larger influence and accordingly once again reduce the data throughput. In the case of deviations from the theoretically-determined ideal line, information is obtained regarding defective matching (for example, clipping), faulty hardware, defective implementation and resource efficiency (performance). Beyond HSDPA, the named technologies and parameters, which are relevant for the invention, are also part of the UMTS LTE specification. Accordingly, the invention is not restricted to the context of HSDPA.

In one embodiment of the invention, the measurement method comprises the steps of selecting an operating parameter to be measured; selecting a variable parameter; setting the measurement parameters; measuring the selected operating parameter to be measured dependent upon the selected variable parameter; and presenting the measured results, wherein either the transmission power or the Transport Combination Format Indicator (TFCI) can be selected as the variable parameter.

In a further embodiment, the throughput can be selected as the operating parameter to be measured. Furthermore, the Channel Quality Indicator (CQI) or the number of re-transmissions necessary can be selected as the operating parameter to be measured.

Moreover, in a further embodiment of the invention, the setting of the measurement parameters can comprise the following steps: setting a measurement interval; setting the number of test points within the set measurement interval; and setting the number of measurements per test point.

Furthermore, the measurement method can comprise a configuration of the display of the measured results. In this context, the configuration can contain the selection of one or more display options, wherein the variance of the measured values for a given test point; the average of the measured values for a given test point; and the valid range of the measured results recorded can be presented.

The display of the measured results can include the plotting of the operating parameter against the variable parameter.

The implementation of the measurement can include the variation of the selected variable parameter against the set measurement range. The non-selected variable parameter can be held constant in this context.

Further embodiments of the invention also contain software for implementing a measurement method according to one of the previously-described embodiments on a computer or a storage medium, on which a corresponding software is recorded.

A measuring device according to one embodiment of the invention can comprise means for selecting the operating parameter to be measured; means for selecting a variable parameter; means for setting the measurement parameters; means for measuring the selected value to be measured dependent upon the selected variable parameter; and a display unit for display of the measured results, wherein either the transmission power or the Transport Combination Format Indicator (TFCI) can be selected as the variable parameter.

BRIEF DESCRIPTION OF THE DRAWINGS

These and other properties, aspects and advantages of the present invention are explained in greater detail in the following detailed description, with reference to the attached drawings. The drawings are as follows.

DETAILED DESCRIPTION OF EXEMPLARY EMBODIMENTS OF THE INVENTION

Figure 3:
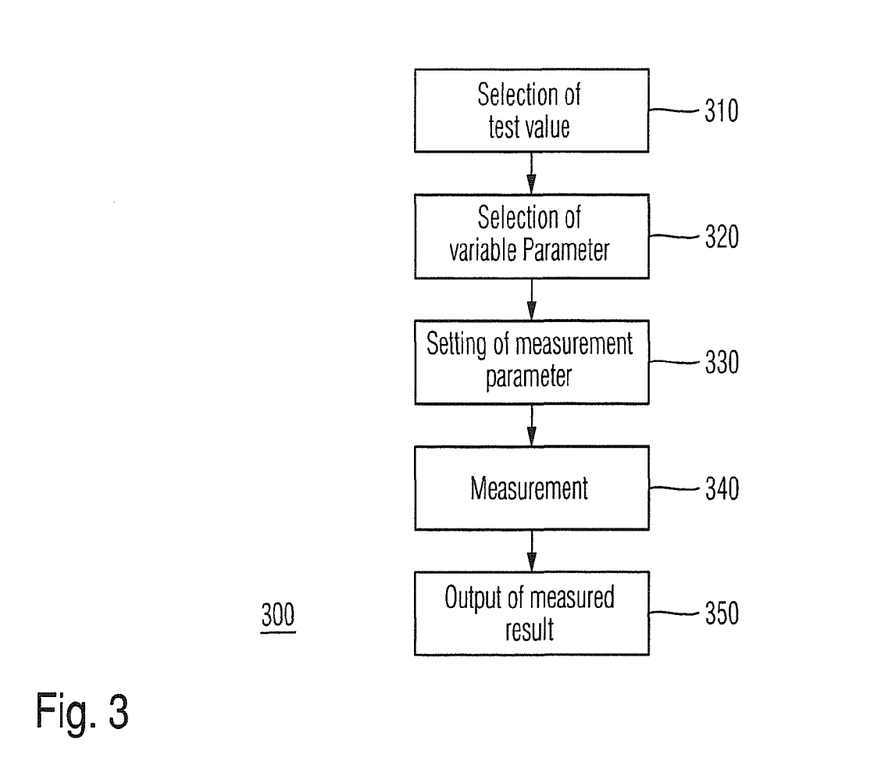
FIG. 3 shows a flow chart for a measurement method according to one embodiment of the present invention.

FIG. 3 shows a flow chart for a measurement method 300 according to one embodiment of the present invention.

Initially, in step 310, an operating parameter to be measured can be selected. In one embodiment of the invention, the throughput, the Channel-Quality Indicator (CQI) reported back from the user equipment or the number of necessary re-transmissions (repetitions) can be selected as measured values. It should be pointed out at this point, that the measuring method according to the invention is not restricted to the three operating parameters named, but these are indicated only as examples. Further operating parameters, which, when measured in conjunction with the variable parameters according to the invention, allow inferences about the status and the quality of the equipment used, are also conceivable.

In step 320, a variable parameter can be selected. In the present embodiment, either the transmission power or the Transport Format Combination Indicator (TFCI) can be selected as the variable parameter. The order in which steps 310 and 320 are executed is not relevant in this context.

In the next step 330, the measurement parameters can be set. In one embodiment of the invention, the setting of the measurement parameters can include the setting of a measurement interval. Furthermore, it can include the setting of the number of test points within a given measurement interval, for example, within the previously-set measurement interval. Moreover, it is possible to set the number of measurements per test point.

In step 340, the selected operating parameter is then measured dependent upon the selected variable parameter, by varying the selected variable parameter within a specified interval and implementing at each given test point a given number of measurements of the selected test value.

In step 350, the measured results obtained are finally presented. In one embodiment of the invention, the display of the measured results obtained contains the plotting of the selected measurement value against the variable parameter in an appropriate coordinate system.

In a further embodiment of the invention, the type of display can be configured in an additional method step. The configuration of the display of measured results can include the selection of one display option from several. For example, according to the invention, it is possible to have the variance of the measured values displayed for a given test point (variance). Furthermore, it is possible to have the average of the measured values displayed for a given test point (Durchschnitt=Average). Additionally, a valid range for the measured results recorded can be presented (Limit).

Exemplary embodiments of the display of measured results are illustrated in the following FIGS. 4a, 4b, 4c and 5a, 5b and 5c.

Figure 4A:
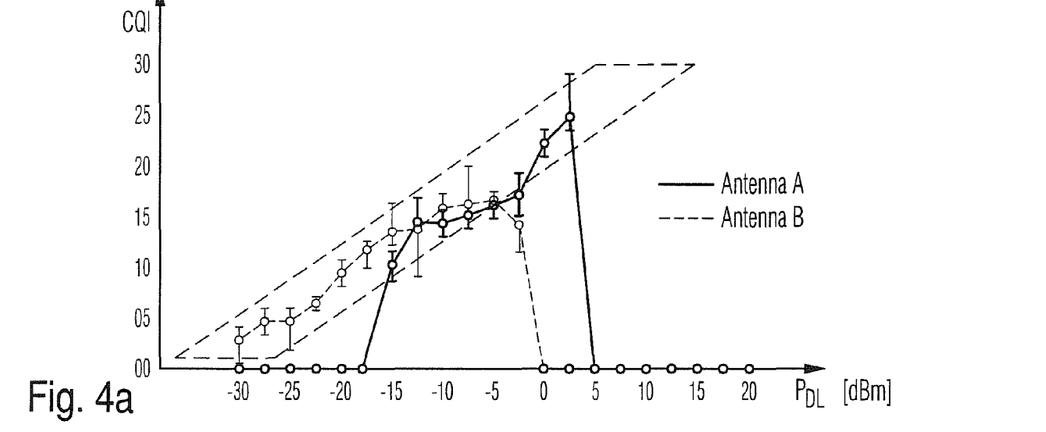
FIGS. 4a, 4b, and 4c show displays of measured CQI and throughput values dependent upon transmission power and TFCI.
Figure 4B:
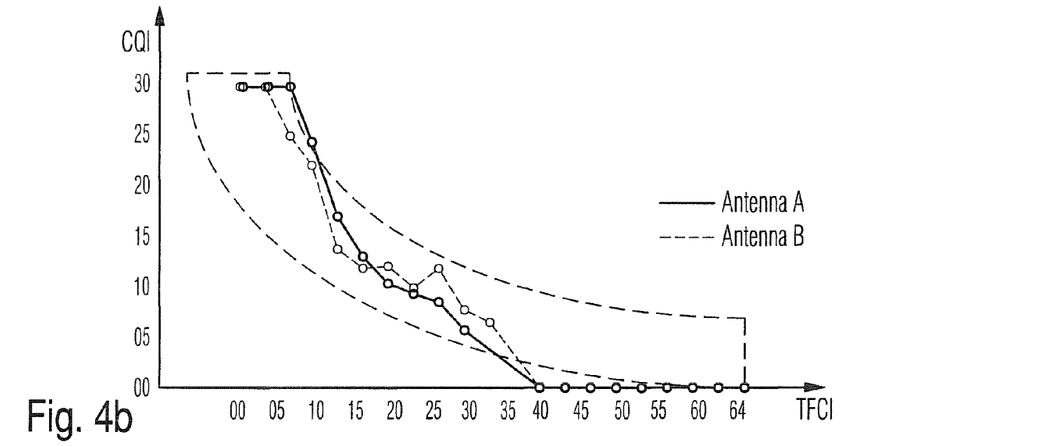
Figure 4C:
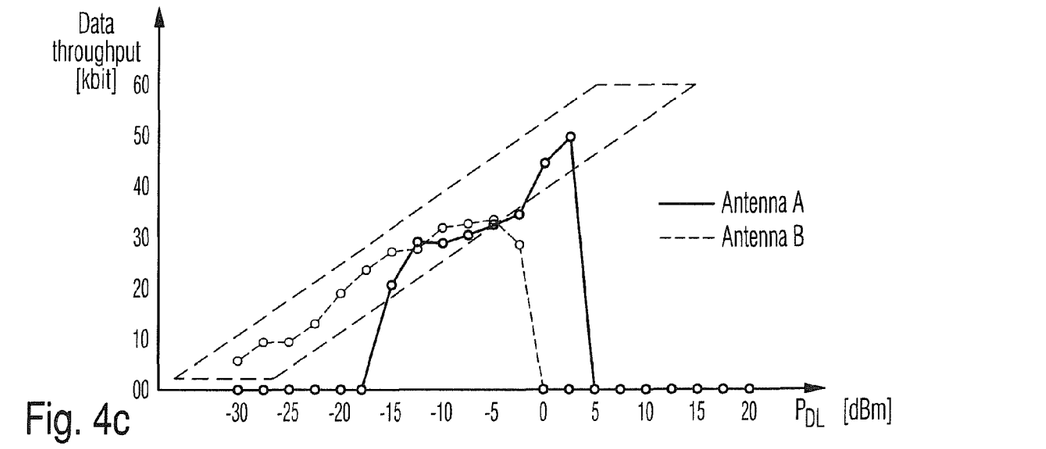

FIGS. 4a, 4b and 4c show displays of measured CQI and throughput values dependent upon transmission power and TFCI. FIG. 4a shows the display aspects described above: variance, average and limit for the operating parameter CQI, measured dependent upon the transmission power and plotted in a two-dimensional coordinate system. In this context, the variance is presented by a vertical bar over every test point, limited by the respective maximum and minimum measured value per test point. The average is presented via a round circle. The applicable range corresponds to the region limited by the dotted line. In one embodiment of the invention, measured results outside this region can be presented in order to improve the overview and to support the interpretation using a special shape or colour.

FIG. 4b shows the possible display aspects average and limit for the operating parameter CQI, in a similar manner to FIG. 4a, measured dependent upon the Transport Format Combination Indicator (TFCI). FIG. 4c finally shows the average measured throughput (in kbit), in a similar manner to FIGS. 4a and 4b.

As shown in the diagram, the displays each relate to a system with 2 antennas A and B. In other words, the displays refer to a 2×2 MIMO (Multiple-In-Multiple-Out) system.

Figure 5A:
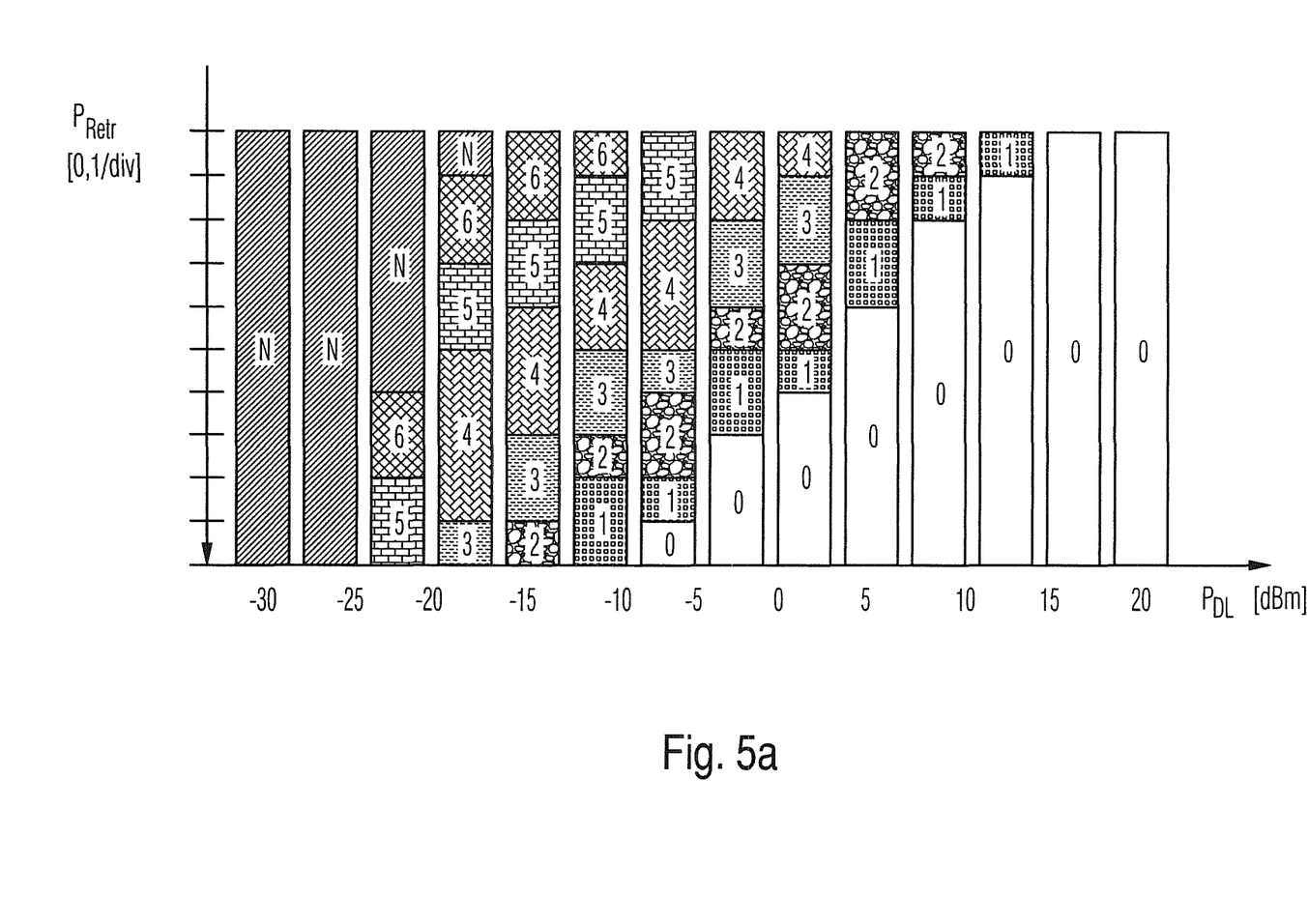
FIGS. 5a, 5b, and 5c show displays of measured re-transmissions (repetitions) dependent upon transmission power and TFCI.
Figure 5B:
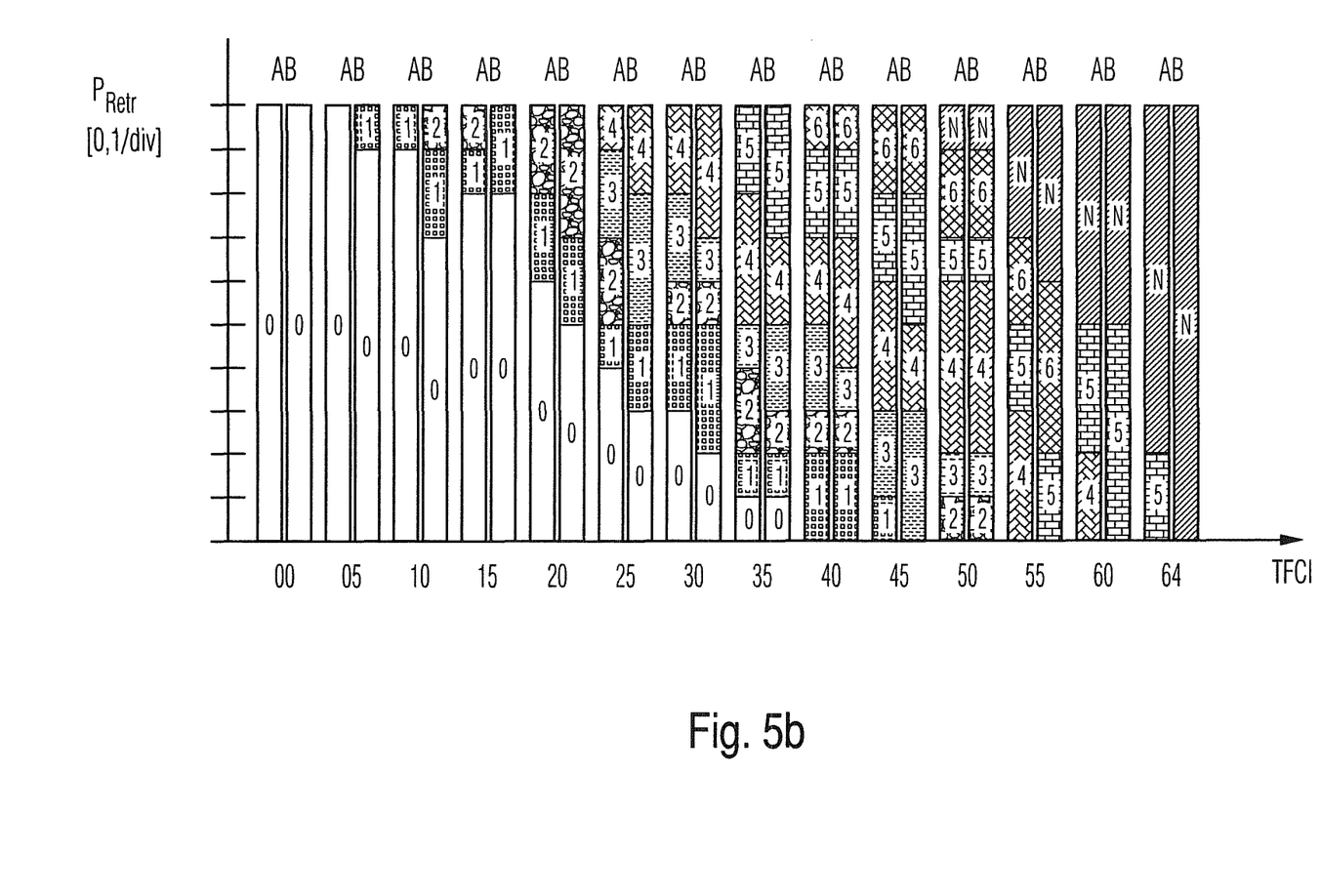
Figure 5C:
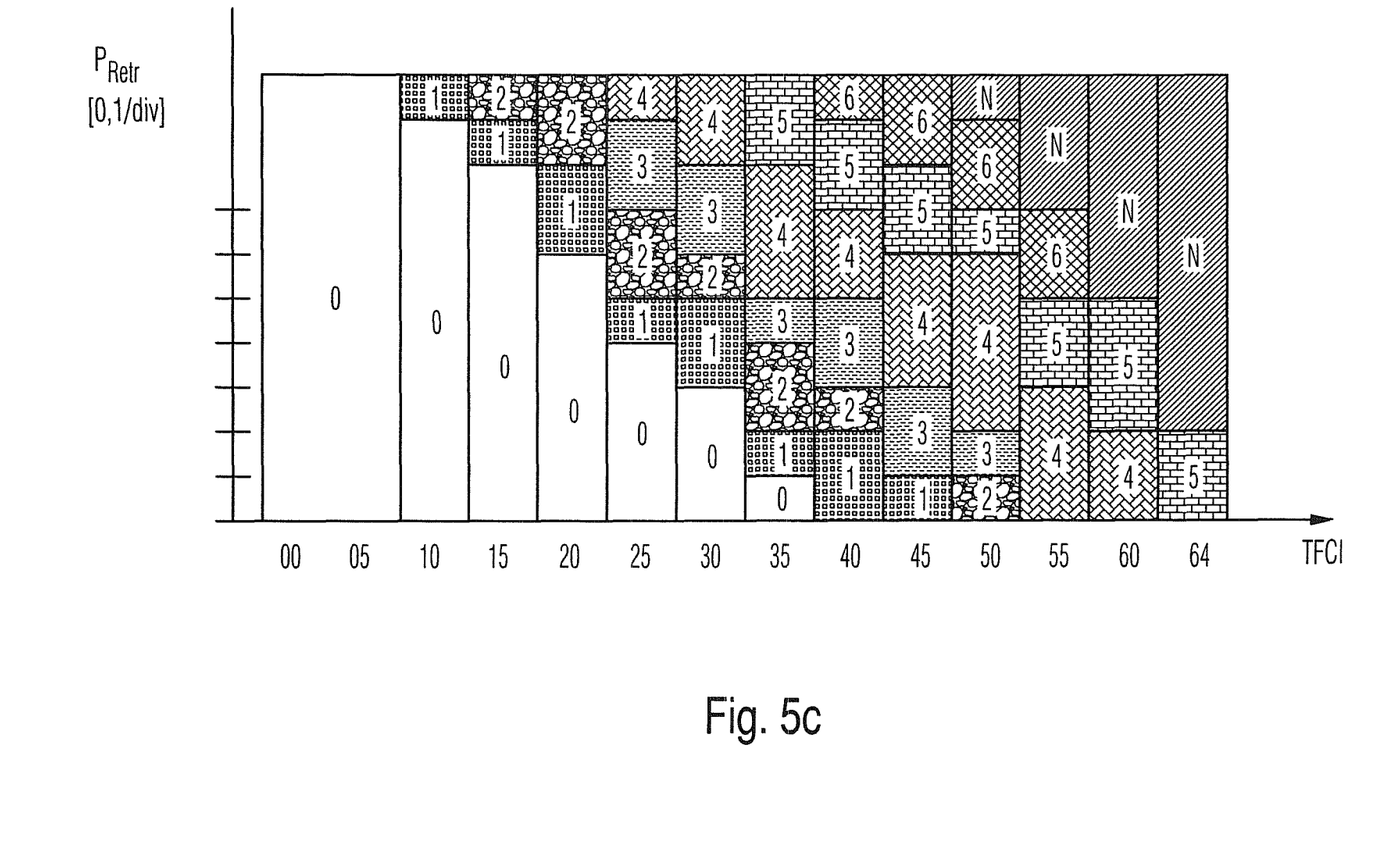

FIGS. 5a, 5b and 5c show displays of the number of re-transmissions or respectively new transmissions of the same data packet, in order to assign this in an error-free manner to a given user device (User Equipment) UE dependent upon the transmission power and TFCI.

The bars show the percentage proportion of data packets, which could be assigned in the first attempt (0) or respectively in one of the subsequent re-transmissions (1-6). If a data packet could not be assigned even after (in the present example) six re-transmissions, this fact is displayed in the diagram by (N). The maximum number is not limited to six, but can assume a value corresponding to the transmission method used or its specification.

For MIMO in the case of Spatial Multiplexing, the display of the re-transmissions can be expanded to the corresponding number of streams (two or four antennas) (see FIG. 5b).

Figure 6:
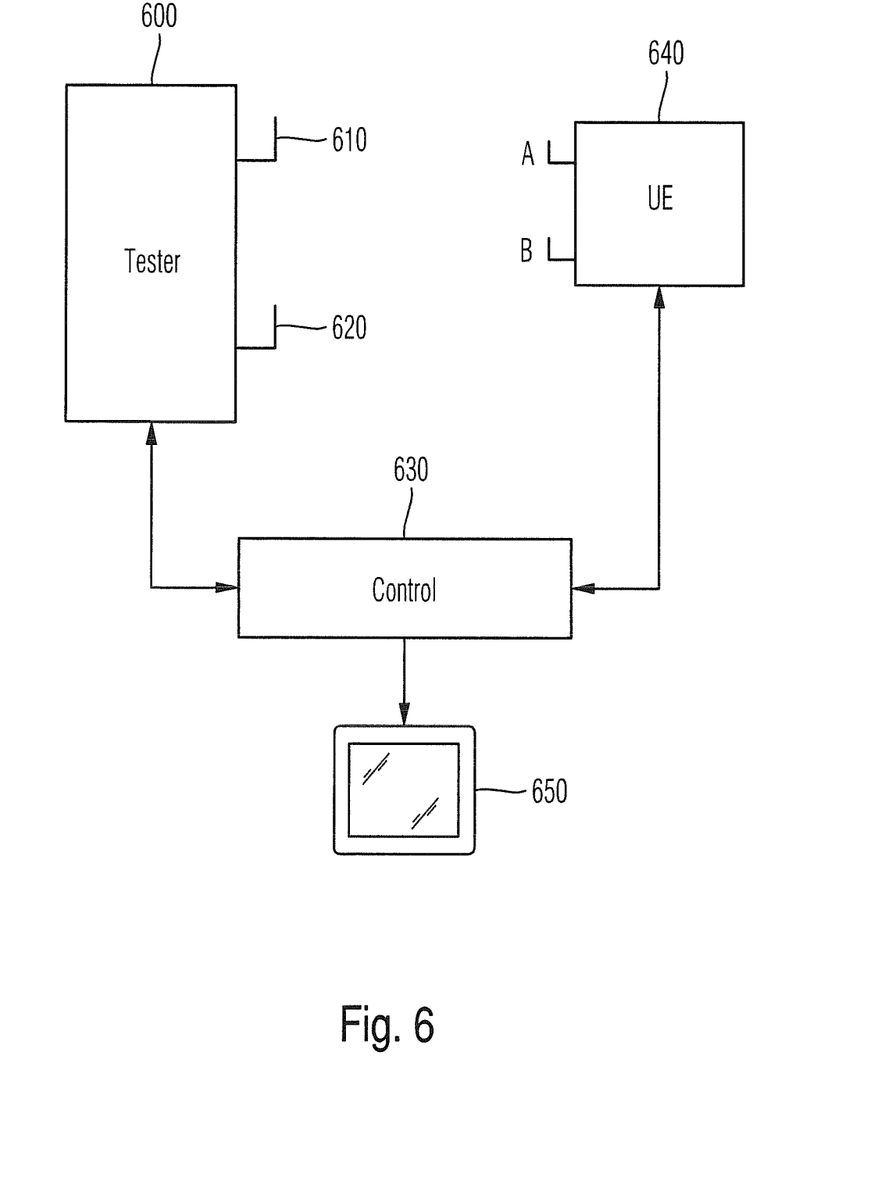
FIG. 6 shows a schematic display of a measurement system with a measuring device according to one embodiment of the present invention.

FIG. 6 shows a configuration of a measurement system according to the invention, in which a measuring device 600 according to one embodiment of the present invention for measuring and testing a user device UE is used. The measuring device 600 provides one or more antennas 610, 620. A control unit 630 for controlling the measurement process is connected to the measuring device 600 and to a user device 640 to be measured. The user device 640 also provides one or more antennas A, B. The control unit is connected to a display unit 650, which can be disposed on or in the measuring device 600.

Figure 7:
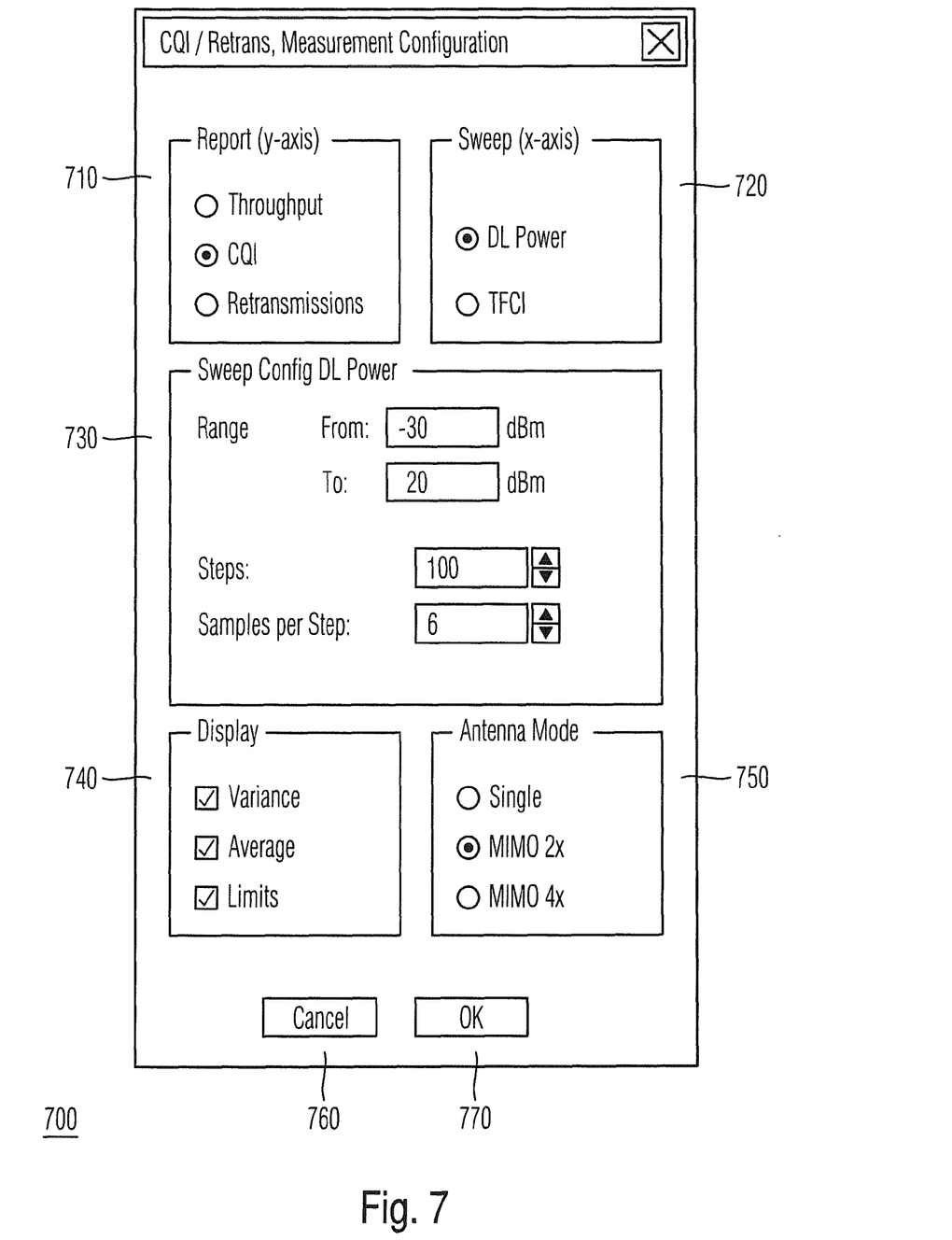
FIG. 7 shows a dialogue for the parametrisation of the measuring device from FIG. 6 for implementing a measurement method according to one embodiment of the invention.

FIG. 7 shows a dialogue 700 for setting the parameters of a measurement. The dialogue is subdivided into several fields, in which the individual settings can be selected or entered. In field 710, an operating parameter, which is to be measured, can be set. In the present embodiment, the field offers three different operating parameters: throughput, Channel-Quality Indicator (CQI) and the number of retransmissions or transmission repetitions.

In field 720, a variable parameter can be selected, which is to be varied by the measuring device 600 or respectively the control unit 630, in order to determine a correlation with the measured operating parameter. In the present embodiment, the field offers two different variable parameters, the transmission power and the so-called Transport Format Combination Indicator TFCI.

In field 730, different measured parameters of the measuring device 600 can be specified. In the present embodiment, the field offers the possibility to specify the measurement range, the number of test points and the number of measurements per test point.

In field 740, different display options can be selected, wherein the selection can be implemented in a cumulative manner. In the present embodiment, it is possible to have the variance, the average of the measured results per test point and the range of validity of the measured results displayed.

Finally, in field 750, it is possible to specify, by way of alternative, whether the measurement is to be implemented in single-antenna mode (single), in two-antenna mode (2×) or in four-antenna mode (4×). The dialogue is concluded by activating the "OK" switch 770 or the "Cancel" switch 760.

The following abbreviations have been used in the present application:

3GPP 3rd Generation Partnership Project
ACK Acknowledgement
AMC Adaptive Modulation and Coding
BLER Block Error Rate
CQI Channel Quality Information
DPCH Dedicated Physical Channel
DTX Discontinuous Transmission
EVM Error Vector Magnitude
FP Frame Protocol
GPRS General Packet Radio Service
GSM Global System for Mobile Communications
HARQ Hybrid Automatic Repeat Request
HSDPA High Speed Downlink Packet Access
HS-DPCCH High Speed Dedicated Physical Control Channel
HS-(P)DSCH High Speed (Physical) Downlink Shared Channel
HS-SCCH High Speed Shared Control Channel
MAC Medium Access Control
MAC-hs Medium Access Control—high speed
NACK Negative Acknowledgement
NAS Non-Access Stratum
PHY Physical Layer
QPSK Quadrature Phase Shift Keying
QAM Quadrature Amplitude Modulation
RLC Radio Link Control
RRC Radio Resource Control
RV Redundancy Version
SF Spreading Factor
SML Soft Metric Location
TFCI Transport Format Combination Indicator
TS Technical Specification
TTCN Tree and Tabular Combined Notation
TTI Transmission Time Interval
UE User Equipment
UMTS Universal Mobile Telecommunications System

The invention claimed is:

1. A measurement method for a mobile telephone system with a high speed data packet access method, comprising:
   selecting an operating parameter to be measured by an operating parameter selector;
   selecting a variable parameter;
   setting a measurement parameter by setting a measurement interval;
   measuring by a measurement system the selected operating parameter to be measured dependent upon the selected variable parameter by varying the selected variable parameter within the measurement interval; and
   displaying on a display unit measured results;
   wherein either a transmission power or a Transport Format Combination Indicator is selected as the variable parameter,
   wherein a Channel Quality Indicator is selected as the operating parameter to be measured,
   wherein information regarding faulty hardware and resource efficiency is obtained, based on one or more of the Transport Format Combination Identifier and the Channel Quality Indicator, and
   wherein a display of a number of re-transmissions is expanded to a corresponding number of streams.

2. The measurement method according to claim 1, wherein setting the measurement parameter further comprises:
   setting a number of test points within the set measurement interval; and
   setting a number of measurements for each of the test points.

3. The measurement method according to claim 1, further comprising:
   configuring a display of the measured results.

4. The measurement method according to claim 3, wherein configuring the display of the measured results includes selection of one of the following display options:
   variance of the measured results for a given test point;
   average of the measured results for a given test point; and
   a valid range of recorded measured results.

5. The measurement method according to claim 3, wherein the display of the measured results comprises:
   plotting a measured value against the variable parameter.

6. The measurement method according to claim 2, characterized in that implementation of a test comprises:
   variation of the selected variable parameter against a set measurement range.

7. The measurement method according to claim 6, wherein a non-selected variable parameter is held constant.

8. A measurement system for a mobile telephone system with a high-speed data packet access method, comprising:
   at least one programmed processor configured to perform the following operations:
      selecting an operating parameter to be measured;
      selecting a variable parameter;
      setting a measurement parameter including setting a measurement interval; and
      testing the selected operating parameter to be measured dependent upon the selected variable parameter by varying the selected variable parameter within the measurement interval; and
   a display unit for presenting measured results;
   wherein either a transmission power or a Transport Format Combination Indicator can be selected as the variable parameter,
   wherein a Channel Quality Indicator can be selected as the operating parameter to be measured,
   wherein information regarding faulty hardware and resource efficiency is obtained, based on one or more of the Transport Format Combination Identifier and the Channel Quality Indicator, and
   wherein a display of a number of re-transmissions is expanded to a corresponding number of streams.

9. The measurement system according to claim 8, wherein the setting the measurement parameter further comprises:
   setting a number of test points within the set measurement interval; and
   setting a number of measurements for each of the test points.

10. The measurement system according to claim 8, further comprising:
   configuring a display of the measured results.

11. The measurement system according to claim 10, wherein the configuring of the display of the measured results further comprise selecting one of the following display options:
   variance of measured values for a given test point;
   average of the measured values for a given test point; and
   a valid range of recorded measured results.

12. The measurement system according to claim 10, wherein the display of the measured results includes a display of a diagram in which the selected operating parameter is plotted against the variable parameter.

13. The measurement system according to claim 8, wherein the testing comprises:
varying the selected variable parameter against a set measurement range.

14. The measurement system according to claim 13, wherein a non-selected variable parameter can be held constant.

15. The measurement method according to claim 2, further comprising:
configuring a display of the measured results.

16. The measurement method according to claim 15, wherein configuring the display of the measured results includes selection of one of the following display options:
variance of the measured results for a given test point;
average of the measured results for a given test point; and
a valid range of recorded measured results.

17. The measurement method according to claim 4, wherein the display of the measured results comprises:
plotting a measured value against the variable parameter.

18. The measurement system according to claim 9, further comprising:
configuring a display of the measured results.

19. The measurement system according to claim 18, wherein the configuring of the display of the measured results further comprises selecting one of the following display options:
variance of measured values for a given test point;
average of the measured values for a given test point; and
a valid range of recorded measured results.

20. The measurement system according to claim 18, wherein the display of the measured results includes a display of a diagram in which the selected operating parameter is plotted against the variable parameter.

* * * * *